United States Patent
Demaj et al.

(10) Patent No.: US 12,437,501 B2
(45) Date of Patent: Oct. 7, 2025

(54) PROCESS FOR MONITORING AT LEAST ONE ELEMENT IN A TEMPORAL SUCCESSION OF PHYSICAL SIGNALS

(71) Applicant: STMicroelectronics (Rousset) SAS, Rousset (FR)

(72) Inventors: Pierre Demaj, Nice (FR); Laurent Folliot, Gourdon (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 319 days.

(21) Appl. No.: 17/968,148

(22) Filed: Oct. 18, 2022

(65) Prior Publication Data
US 2023/0131838 A1    Apr. 27, 2023

(30) Foreign Application Priority Data
Oct. 25, 2021 (FR) ........................ 2111302

(51) Int. Cl.
*G06V 10/62* (2022.01)
*G06V 10/44* (2022.01)

(52) U.S. Cl.
CPC ............ *G06V 10/62* (2022.01); *G06V 10/454* (2022.01); *G06F 2218/02* (2023.01); *G06F 2218/08* (2023.01)

(58) Field of Classification Search
None
See application file for complete search history.

(56) References Cited

U.S. PATENT DOCUMENTS

| | | | |
|---|---|---|---|
| 2016/0321784 | A1 | 11/2016 | Annapureddy |
| 2018/0004275 | A1 | 1/2018 | Tubbs et al. |
| 2019/0213420 | A1 | 7/2019 | Karyodisa et al. |
| 2021/0142086 | A1 | 5/2021 | Berkovich et al. |
| 2021/0142165 | A1 | 5/2021 | Luo et al. |

(Continued)

FOREIGN PATENT DOCUMENTS

EP    3407292 A1    11/2018

OTHER PUBLICATIONS

He, Kaiming et al., "Spatial Pyramid Pooling in Deep Convolutional Networks for Visual Recognition," Computer Vision, ECCV 2014, Part III, Lecture Notes in Computer Science, vol. 8691, Sep. 6-12, 2014, 16 pages.

(Continued)

*Primary Examiner* — Walter L Lindsay, Jr.
*Assistant Examiner* — Geoffrey T Evans
(74) *Attorney, Agent, or Firm* — Slater Matsil, LLP (57) ABSTRACT

According to one aspect, the disclosure proposes a method for detecting events or features in physical signals by implementing an artificial neural network. The method includes evaluating the probability of presence of the event or feature by implementing the artificial neural network. The method includes implementing the artificial neural network in a nominal mode and to which a physical signal having a first so-called nominal resolution is fed, as long as the probability of the presence of the event or feature is below a threshold. The method further includes implementing the artificial neural network in a reduced consumption mode with a reduced resolution, as long as the probability of the presence of the event or feature is above the threshold. The reduced resolution is lower than the first resolution.

20 Claims, 2 Drawing Sheets

(56) References Cited

U.S. PATENT DOCUMENTS

2021/0271912 A1    9/2021   Wu et al.

OTHER PUBLICATIONS

Sermanet, Pierre et al., "OverFeat: Integrated Recognition, Localization and Detection using Convolutional Networks," arXiv.org, Feb. 24, 2014, 16 pages.
Wang, Fan et al., "Multi-Scale Representation based on Convolutional Neural Networks for Tracking, " Commincation and Information Processing, ACM, Nov. 2, 2018, pp. 96-101.
Qin, Haotong, et al., "Binary Neural Networks: A Survey." arXiv:2004.03333v1 [cs.NE] Mar. 31, 2020, 39 pages.

PROCESS FOR MONITORING AT LEAST ONE ELEMENT IN A TEMPORAL SUCCESSION OF PHYSICAL SIGNALS

CROSS-REFERENCE TO RELATED APPLICATIONS

This application claims priority to French Patent Application No. 2111302, filed on Oct. 25, 2021, which application is hereby incorporated by reference herein in its entirety.

TECHNICAL FIELD

The present disclosure generally relates to artificial neural networks, and in particular embodiments, to artificial neural networks configured to track features in a time sequence of physical signals.

BACKGROUND

Certain neural networks are adapted to track features in a time sequence of physical signals. For example, certain neural networks are adapted to track the position of objects or people in a sequence of images of a scene forming a video.

These neural networks are configured to be fed a physical signal as input and output detection data. The detection data can include information about the size of the feature detected, the position of the center of this feature, or the class of this feature. In particular, neural networks can be configured to generate a frame around the objects or people to be detected in an image.

In particular, the artificial neural networks usually include a succession of neuron layers. Each neuron layer receives data fed thereto or received from a preceding layer in the succession of layers, and applies weights to these data to obtain layer output data that can either be transmitted to a subsequent layer in the succession of layers or output by the artificial neural network.

The weights are data, more particularly parameters, of neurons that can be configured to obtain good output data. These weights are defined during a neural network training phase.

The artificial neural networks are executed several times and are fed temporally successive physical signals to track the features in these physical signals.

These neural networks are typically complex. The execution thereof typically requires a large number of computations to obtain precise data. The execution time of these neural networks is thus generally long. However, the execution time of a neural network directly impacts the processing rate of the physical signals. In particular, the longer the execution time of a neural network, the lower the processing rate of the physical signals. As a result, a neural network's execution time can affect the artificial neural network's performance for tracking features in the physical signals.

One proposal for increasing the processing rate of the physical signals involves simplifying the artificial neural network after the artificial neural network training phase. For example, an already-trained neural network can be simplified by quantifying it to limit the computations to be carried out during the execution of this neural network. However, simplified neural networks can result in a loss of neural network performance for detecting and tracking features in the physical signals fed to this neural network.

Therefore, a solution to increase the processing rate of the physical signals to ensure efficient tracking of the features in these physical signals is advantageous.

SUMMARY

According to one aspect, the invention proposes a method for tracking features in a time sequence of physical signals by implementing an artificial neural network, wherein the artificial neural network has a single set of weights and is configured to be fed physical signals that can have different resolutions, the method including: a nominal mode wherein the artificial neural network is executed and fed a physical signal having a first so-called nominal resolution, an accelerated processing mode wherein the artificial neural network is executed and fed a physical signal having a second so-called reduced resolution, which is lower than the first resolution, the reduced resolution of the physical signal fed to the artificial neural network being a multiple of a ratio between the nominal resolution of the physical signal fed thereto and a resolution output by the artificial neural network when the physical signal fed thereto is of nominal resolution, and wherein the method includes: at least one evaluation of a probability of presence of a feature to be tracked in a physical signal of the sequence of physical signals by implementing the artificial neural network to which this physical signal is fed, executing the artificial neural network in nominal mode as long as the probability of presence of the feature is below a threshold, and executing the artificial neural network in accelerated processing mode as long as the probability of presence of the feature is above the threshold so as to increase a processing rate of the physical signals compared to a processing rate of the physical signals that can be obtained by executing the artificial neural network in nominal mode.

The artificial neural network is thus a multi-resolution neural network. Such a neural network is trained by being fed physical signals of different resolutions. For example, a multi-resolution neural network adapted to track features in a sequence of images can be successively fed the images. The images fed to the artificial neural network can have different resolutions.

The number of computations to be carried out to execute the multi-resolution neural network varies as a function of the resolution of the physical signal fed to the artificial neural network. In particular, the lower the resolution of the physical signal fed thereto, the fewer the computations required to execute the artificial neural network before generating output data from the artificial neural network. Thus, the lower the resolution of the physical signal fed thereto, the shorter the execution time of the artificial neural network. Moreover, the lower the resolution of the physical signal fed thereto, the less power consumed as a result of the implementation of the artificial neural network.

Thus, by executing the artificial neural network with a reduced resolution, the processing rate of the physical signals can be increased. Thus the acquisition rate of the physical signals can also be increased. In this way, the artificial neural network's performance in tracking features in the sequence of physical signals can be improved, particularly when the position of the feature to be tracked in the physical signal changes quickly. Furthermore, the power consumption resulting from the execution of the artificial neural network with a reduced resolution and an increased processing rate is in the order of that resulting from the execution of the artificial neural network with the nominal resolution and nominal processing rate.

More particularly, executing the artificial neural network using a nominal resolution provides more reliable output data than executing the artificial neural network using a reduced resolution. Thus, initially executing the artificial neural network using the nominal resolution ensures that the feature to be tracked is effectively present in the signal before tracking this feature by executing the artificial neural network using the reduced resolution.

The evaluation of the probability of the presence of the feature is carried out regularly after one or more implementations of the artificial neural network using the nominal resolution or a plurality of implementations of the artificial neural network using the reduced resolution.

Such a method is relatively simple to implement. Moreover, the use of a multi-resolution neural network does not require the storage space for the artificial neural network in the memory to be increased since the artificial neural network has only one set of weights.

In one advantageous implementation, the threshold is defined according to the desired recall or precision of the artificial neural network.

Preferably, the physical signals fed to the artificial neural network are images.

In one advantageous implementation, the method includes filtering out erroneous detections of features by the artificial neural network when executed in the accelerated processing mode, the filtering being implemented by comparing the position of each feature detected in a given physical signal of the time sequence of physical signals with a position of each feature detected in a physical signal which directly precedes the given physical signal in the time sequence of physical signals.

In particular, on a given image, the execution of the artificial neural network using the reduced resolution can be less precise and can thus generate false alarms. False alarms correspond to detections despite the absence of the feature to be detected. False alarms are thus erroneous detections. These false alarms can occur when the probability of the presence threshold of a feature is set relatively low so that detections are not missed when the feature is present in the physical signal.

Filtering the detections by taking into account the position of the features detected in the preceding physical signals helps to reduce false alarms. Thus, filtering eliminates detections that can result in false alarms to maintain good performance levels.

According to another aspect, the invention proposes a computer program including instructions which, when the program is executed by a computer, cause the computer to implement an artificial neural network to track features in a time sequence of physical signals fed to this neural network, in which program the artificial neural network has a single set of weights and is configured to be fed physical signals which can have different resolutions, the artificial neural network being capable of being implemented in a nominal mode wherein the artificial neural network is executed and fed a physical signal having a first so-called nominal resolution, an accelerated processing mode wherein the artificial neural network is executed and fed a physical signal having a second so-called reduced resolution, which is lower than the first resolution, the reduced resolution of the physical signal fed to the artificial neural network being a multiple of a ratio between the nominal resolution of the physical signal fed thereto and a resolution output by the artificial neural network when the physical signal fed thereto is of nominal resolution, and wherein the program is configured to: evaluate the probability of the presence of a feature to be tracked in a physical signal of the sequence of physical signals by implementing the artificial neural network to which this physical signal is fed, executing the artificial neural network in nominal mode as long as the probability of the presence of the feature is below a threshold, and executing the artificial neural network in accelerated processing mode as long as the probability of the presence of the feature is above the threshold to increase a processing rate of the physical signals.

According to another aspect, the invention proposes a microcontroller including a memory in which a program as described hereinabove is stored and a processor configured to execute the program.

According to another aspect, the invention proposes a method for tracking features in a time sequence of physical signals, the method including: a nominal mode wherein a reference neural network is executed, an accelerated processing mode wherein an auxiliary artificial neural network that is separate from the reference neural network is executed, the auxiliary artificial neural network being simplified compared to the reference neural network, and wherein the method includes: at least one evaluation of a probability of presence of a feature to be tracked in a physical signal of the sequence of physical signals by implementing the reference neural network or the auxiliary neural network to which this physical signal is fed, executing the reference neural network in nominal mode as long as the probability of presence of the feature is below a threshold, and executing the auxiliary neural network in accelerated processing mode as long as the probability of presence of the feature is above the threshold so as to increase a processing rate of the physical signals compared to a processing rate of the physical signals that can be obtained by executing the reference neural network in nominal mode.

The reference neural network and the auxiliary neural network are adapted to track features in a sequence of images. They can successively process the images.

The auxiliary neural network is separate from the reference neural network. A person skilled in the art will know how to define a neural network that is simplified relative to the reference neural network. In particular, the auxiliary neural network can have a different topology than the reference neural network. In particular, the auxiliary neural network can have weights that are different from the weights of the reference neural network. The auxiliary neural network can be designed from the reference neural network by deleting some of the neurons of the reference neural network. Moreover, the auxiliary neural network can be quantified in binary (refer in particular to the publication entitled "Binary Neural Networks: A Survey" by Haotong Qin et al., published on Mar. 31, 2020).

The number of computations required to execute the auxiliary neural network is smaller than the number of computations required to execute the reference neural network. The execution time for the auxiliary neural network is thus shorter than the execution time for the reference neural network. The auxiliary neural network is thus configured to generate output data more quickly from a physical signal fed thereto than the reference neural network fed the same physical signal. It goes without saying that the data output by the auxiliary neural network is not necessarily identical to those which can be output by the reference neural network.

Thus, the execution of the auxiliary neural network increases the processing rate of the physical signals, and thus also increases the acquisition rate of the physical signals. In this way, the performance in tracking features in the sequence of physical signals can be improved, in particular when the position of the feature to be tracked in the physical signal changes quickly. Furthermore, the power consumption resulting from the execution of the auxiliary neural network with the increased processing rate is in the order of that resulting from the execution of the reference neural network with the nominal processing rate.

More particularly, executing the reference neural network provides more reliable output data than executing the auxiliary neural network. Thus, initially executing the reference neural network ensures that the feature to be tracked is effectively present in the signal before tracking this feature by executing the auxiliary neural network.

Such a method is also relatively simple to implement.

According to another aspect, the invention proposes a computer program including instructions which, when the program is executed by a computer, cause the computer to implement neural networks to track features in a time sequence of physical signals fed to this neural network, the program including: a nominal mode wherein a reference neural network is executed, an accelerated processing mode wherein an auxiliary artificial neural network that is separate from the reference neural network is executed, the auxiliary artificial neural network being simplified compared to the reference neural network, and wherein the program is configured to: evaluate a probability of presence of a feature to be tracked in a physical signal of the sequence of physical signals by implementing the reference neural network or the auxiliary neural network to which this physical signal is fed, execute the reference neural network in nominal mode as long as the probability of presence of the feature is below a threshold, and execute the auxiliary neural network in accelerated processing mode as long as the probability of presence of the feature is above the threshold so as to increase a processing rate of the physical signals compared to a processing rate of the physical signals that can be obtained by executing the reference neural network in nominal mode.

According to another aspect, the invention proposes a microcontroller including: a memory in which a program as described hereinabove is stored and a processor configured to execute the program.

BRIEF DESCRIPTION OF THE DRAWINGS

Other advantages and features of the invention will become apparent upon examining the detailed description of non-limiting embodiments and implementations of the invention, and from the accompanying drawings in which.

DETAILED DESCRIPTION OF ILLUSTRATIVE EMBODIMENTS

Figure 1:
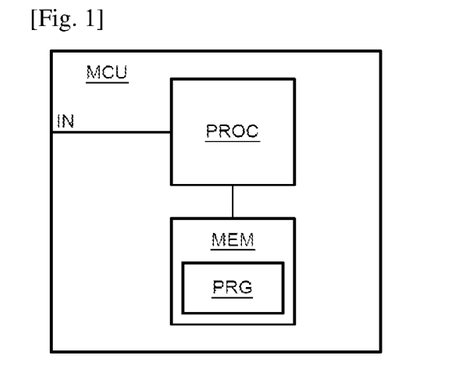
FIG. 1 is a block diagram of an embodiment microcontroller.

FIG. 1 shows a microcontroller MCU configured to implement a method for tracking features in a sequence of physical signals. For example, the tracking method allows objects or people to be detected and tracked in time-lapse images. The microcontroller MCU includes an input IN configured to successively receive the physical signals. For example, the sequence of physical signals can be a sequence of images of a video of a scene acquired over time by a camera. Alternatively, the physical signals can come from any other type of sensor. For example, the physical signals can be audio signals from a microphone or signals from an accelerometer, a gyroscope, a magnetometer or a time-of-flight sensor.

The microcontroller MCU includes a memory MEM in which a program PRG is stored to implement the tracking method. The microcontroller MCU includes a processor PROC configured to execute the program PRG.

The program PRG includes instructions to execute a multi-resolution neural network to detect features in the physical signals it is fed to track the position of these features in the received physical signals over time.

The artificial neural network is configured to be fed a physical signal and to output detection data which can include information about the size of each feature detected, a position of a center of this feature, or the class of this feature. In particular, the artificial neural network can be configured to frame the features to be detected in the physical signal. For example, the artificial neural network can be configured to frame objects or people to be detected in an image.

The artificial neural network is a multi-resolution neural network. The artificial neural network thus has a single set of weights but is configured to be fed physical signals that can have different resolutions.

In embodiments, the artificial neural network can be fed images of different resolutions. In an embodiment, the images can be provided to the microcontroller by a camera (not shown in the figures). The camera can thus be adapted to modify the resolution of the acquired images. In other embodiments, the microcontroller can be configured to modify the resolution of an image transmitted by the camera to obtain an image with a reduced resolution.

In embodiments, the artificial neural network is a network that has been trained by being fed physical signals of different resolutions. In an embodiment, the artificial neural network is trained by being fed physical signals with a nominal resolution and physical signals with a reduced resolution. The reduced resolution is a lower resolution than the nominal resolution. One or more reduced resolutions can be used for the physical signals fed to the artificial neural network. This nominal resolution typically corresponds to a nominal resolution of the camera. The performance of the artificial neural network can be evaluated according to different resolutions of the physical signals fed thereto. Training is carried out to define a neural network with optimal performance for the nominal resolution and performance that is as little degraded as possible for the reduced resolution.

In embodiments, when training the artificial neural network, the weights of the artificial neural network are adjusted, and then the performance of the modified network is evaluated according to the different resolutions used. If the performance of the artificial neural network is satisfactory, the training of the network is ended, and the artificial neural network can be quantified to reduce memory usage and execution time of the artificial neural network.

Moreover, the artificial neural network is configured to be fed a physical signal with a resolution that is different from the resolution of the output data of the artificial neural network. The artificial neural network thus has a given ratio between the nominal resolution at the input and the resolution at the output of the artificial neural network when it is fed a physical signal with this nominal resolution. The resolutions that can be fed to the artificial neural network are thus multiples of this ratio in order to obtain an actual resolution at the output of the artificial neural network for each resolution that can be fed thereto.

In embodiments, in the case where the physical signal is an image, if the nominal resolution is 224×224 and if the ratio of the nominal resolution at the input to the resolution at the output of the artificial neural network is 16, then the artificial neural network can be fed reduced resolutions that are multiples of 16, and in particular the following resolutions: 208×208, 192×192, 176×176.

In this case, the tracking method has two modes of operation.

In a first so-called nominal mode, the artificial neural network is executed and fed a physical signal having the nominal resolution.

In a second so-called accelerated processing mode, the artificial neural network is executed and fed a physical signal having a reduced resolution compared to the nominal resolution.

Executing the artificial neural network using the reduced resolution requires fewer computations than the execution thereof using the nominal resolution. Executing the artificial neural network in the accelerated processing mode thus increases the processing rate of the physical signals compared to that in the nominal mode.

In embodiments, by multiplying the resolution of a physical signal by a number $\gamma$ of less than 1, the number of operations to be carried out can be reduced by a number close to $\gamma^2$. In this way, the execution time of the artificial neural network is also reduced by a number close to $\gamma^2$. In this way, the processing rate of the physical signals can be increased by $1/\gamma^2$. Furthermore, the power consumption resulting from the execution of the artificial neural network in the accelerated processing mode remains equivalent to that resulting from the execution of the artificial neural network in nominal mode.

Figure 2:
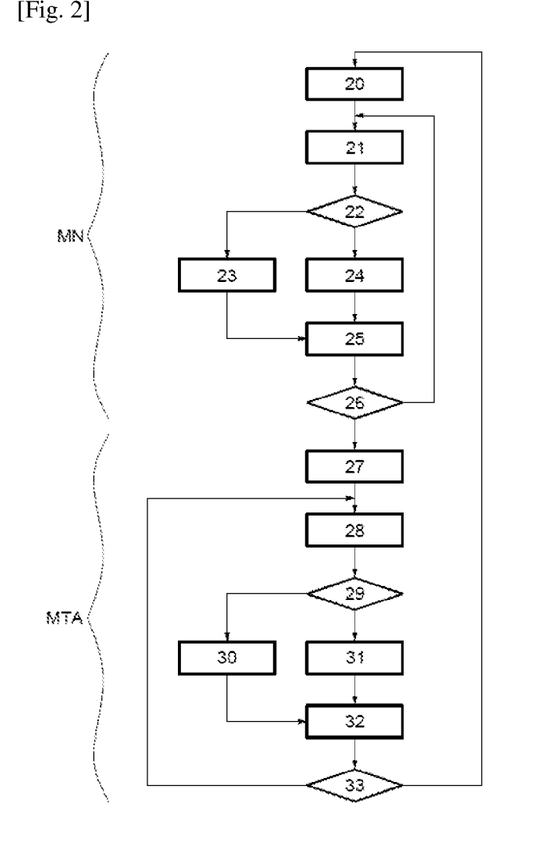
FIG. 2 is a flow chart of an embodiment for tracking features in a sequence of physical signals.

FIG. 2 shows a state diagram representing a method for tracking features in a sequence of physical signals that can be implemented by the microcontroller.

The method consists of initially executing the artificial neural network in nominal mode, then executing the artificial neural network in accelerated processing mode as long as the probability of the presence of a feature in the physical signals is high.

In particular, in this case, the artificial neural network is executed in nominal mode MN in the top part of the diagram and is executed in accelerated processing mode MTA in the bottom part of the diagram.

The probability of the presence of a feature is evaluated based on the number of detections of the feature obtained over a given period.

In particular, the microcontroller uses a buffer memory Sb[ ] to count the number of features detected over a period T1 for the nominal mode and over a period T2 for the accelerated processing mode. The periods T1 and T2 can be the same.

Thus, the method includes step 20 of initializing the nominal mode wherein the buffer Sb[ ] is reset by setting the values Sb[0] to Sb[T1−1] to 0.

The method then includes step 21 of executing the artificial neural network in the nominal mode. The artificial neural network is thus fed a physical signal with the nominal resolution. The execution of the artificial neural network allows, at step 22, the presence or absence of the feature in the physical signal fed thereto to be detected. If the artificial neural network detects that the feature is present in the physical signal for iteration i, then the value of the buffer Sb[i] is set to 1 at step 23. If the artificial neural network detects that the feature is absent from the physical signal for iteration i, then the value of the buffer Sb[i] is set to 0 at step 24. The value of the index i is then incremented at step 25 after step 23 or 24.

The microcontroller then checks that the buffer has been filled at step 26. If the buffer has not been filled, then steps 21 to 25 are repeated to fill the buffer at the end of period T1. When the buffer has been filled, the microcontroller is configured to compare, at step 26, the average value of the values of the buffer Sb[ ] with a threshold K1 defined between 0 and 1. If this average value is below the threshold K1, then the probability of the feature being present is low. The artificial neural network thus continues to be executed in nominal mode for a new period T1. Steps 21 to 26 are repeated as long as the average value of the values of the buffer at the end of a period T1 is above the threshold K1.

If the average value of the values of the buffer at the end of a period T1 is above the threshold K1, then the probability that the feature is present is high. The artificial neural network is thus executed in the accelerated processing mode to increase the processing rate of the physical signals and, therefore, also increase the acquisition rate of the physical signals.

In particular, the method includes step 27 of initializing the accelerated processing mode wherein the buffer Sb[ ] is reset by setting the values Sb[0] to Sb[T2−1] to 0.

The method then includes step 28 of executing the artificial neural network in the accelerated processing mode. The artificial neural network is thus fed a physical signal with the reduced resolution. The execution of the artificial neural network allows, at step 29, the presence or absence of the feature in the physical signal fed thereto to be detected. If the artificial neural network detects that the feature is present in the physical signal for iteration i, then the value of the buffer Sb[i] is set to '1' at step 30. If the artificial neural network detects that the feature is absent from the physical signal for iteration i, then the value of the buffer Sb[i] is set to '0' at step 31. The value of the index i is incremented at step 32 after step 30 or 31.

The microcontroller then checks that the buffer has been filled at step 33. If the buffer has not been filled, then steps 28 to 32 are repeated in order to fill the buffer at the end of period T2. When the buffer has been filled, the microcontroller is configured to compare, at step 33, the average value of the values of the buffer Sb[ ] with a threshold K2 defined between 0 and 1. If this average value is above the threshold K2, then the probability of the feature being present is high, and the artificial neural network continues to be executed in the accelerated processing mode for a new period T2. Steps 28 to 33 are repeated as long as the average value of the values of the buffer at the end of a period T2 is below the threshold K2.

If the average value of the values of the buffer at the end of period T2 is below the threshold K2, then the probability that the feature is present is low. The artificial neural network is then executed in nominal mode, repeating the process from step 20 onwards to ensure that the feature is absent from the physical signal.

In embodiments, if the presence of features at certain times of day is more likely than at other times of day, periods T1 and T2 can be adjusted as a function of the time of day. The periods T1 and T2 can also be adjusted according to the battery's remaining capacity powering the microcontroller, or also according to the darkness surrounding the camera when the physical signal is an image. The periods T1 and T2 can also be adjusted from statistics computed based on the rate of the detections obtained by implementing the detection method in the environment in which the physical signal is obtained. Moreover, when the physical signals are images of a scene, the periods T1 and T2 can be adjusted as a function of the speed of movement of the features in the scene. In particular, the slower the features move, the longer the periods T1 and T2 can be.

The thresholds K1 and K2 can also be adjusted according to the application for which the artificial neural network is being executed. In particular, the thresholds K1 and K2 are selected as a function of a desired recall or precision. Nonetheless, a threshold K1 that is above a false alarm threshold is advantageous in order to prevent the detection of features that are absent from the physical signal which would result in the undue execution of the artificial neural network in accelerated processing mode.

Moreover, since executing the artificial neural network with a reduced resolution is typically less precise than executing the artificial neural network with a nominal resolution, it can be of interest to reduce a confidence threshold for the artificial neural network to ensure that a feature is detected when it is effectively present in the physical signal. The confidence threshold corresponds to a minimum probability that must be met to detect a feature in order to set the value of the buffer Sb[i] to '1'. However, by lowering this confidence threshold, the number of false alarms can rise. False alarms correspond to detections obtained despite the absence of features to be detected in a physical signal.

These false alarms should thus be filtered out to maintain the performance of the accelerated processing mode.

Figure 3:
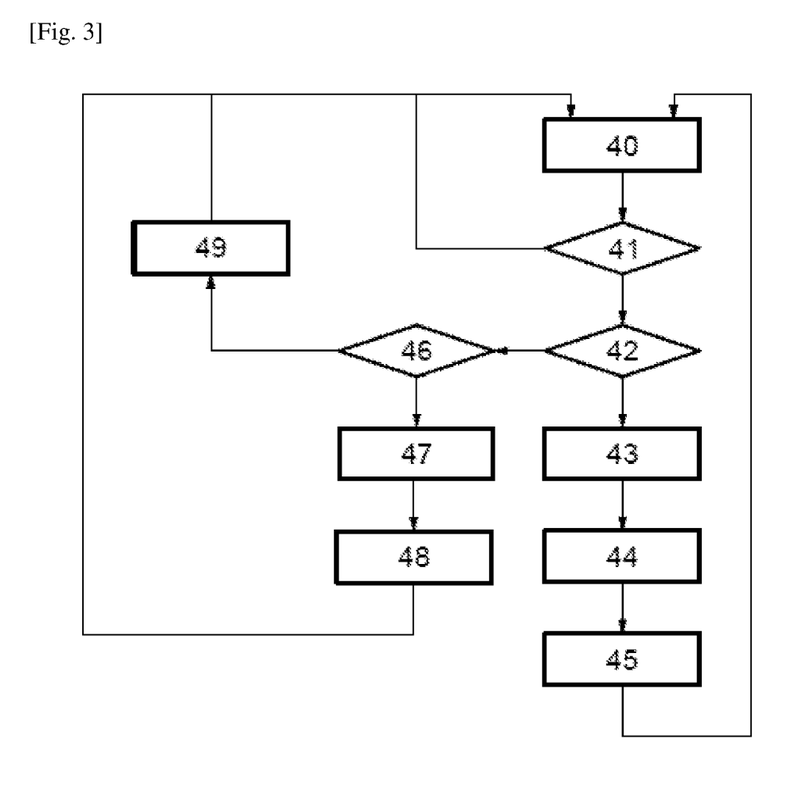
FIG. 3 is a flow chart of an embodiment for reducing false alarms in detections obtained when implementing an accelerated processing mode.

FIG. 3 shows a method for reducing false alarms in the detections obtained when implementing the accelerated processing mode. In this case, the method is implemented within the context of tracking objects or people in a time sequence of images in a video. False alarms are generally random in size and position in the image. In this way, false alarms can be filtered out by comparing the feature detections obtained by different executions of the artificial neural network being fed successive images of a video. In particular, because the accelerated processing mode allows for a faster image processing rate, the position of a feature detected in a given image is more easily predicted in the next image of the video, based on the rate of movement of this feature in the images. In particular, if the center of a new detection is not located within a prediction range computed from a previous detection of a feature, then the new detection is considered to be a false alarm or a new feature entering the camera's field of view.

In particular, the method includes step 40, where the multi-resolution neural network is executed in accelerated processing mode and is fed a reduced resolution image.

The method further includes step 41, where it is determined whether a feature has been detected as a result of executing the artificial neural network at step 40. If no features have been detected, there is no need to filter out false alarms. The artificial neural network can be directly executed again by being fed a new image.

If a feature to be detected was detected at step 41, then the method includes step 42, where it is determined whether the center of the detected feature lies within a prediction range computed based on previous detections of a feature. The manner in which the prediction range is obtained is described with reference to step 45.

If the center of the feature is located within a prediction range obtained based on the previous detections, then the detected feature is considered to correspond to the previously detected feature. The method then includes step 43, where a choice is made to continue tracking the detected feature. Then, at step 44, an estimation of the movement of the detected feature is evaluated. Then, at step 45, the prediction range for the position of the feature in the next image is defined. This prediction range will be used for the next iteration of step 41 if the artificial neural network detects a feature in the next image that it is fed.

The prediction range is defined using the displacement of the position of the center of the feature detected during the previous executions of the artificial neural network. A margin for the prediction range is defined in relation to the dimensions of the feature to take into account inaccuracies in the detections.

Once step 45 is complete, the artificial neural network can be executed again in accelerated processing mode.

If at step 42 it is determined that the center of the feature is not located within a prediction range obtained based on the previous detections, then the method includes step 46, where it is determined whether the center of the detected feature is located near an edge of the image. If the center of the detected feature is located near an edge of the image but not in the prediction range, then the detected feature is provisionally considered to be a new feature to be tracked in the next image fed to the artificial neural network. This feature is then added to a list of features to be tracked at step 47. However, it must subsequently be confirmed that this new feature to be tracked does not correspond to a false alarm at step 48 after executing the artificial neural network again with the next image at step 40.

If the center of the detected feature is neither located near an edge of the image nor located in the prediction range, then the detected feature is considered to be a false alarm and is thus filtered out at step 49.

False alarms can be counted to adapt the threshold K2 used in accelerated processing mode. In particular, the threshold can be brought into line with a false alarm threshold determined from the false alarm count.

It goes without saying that the method described is not limited to the implementation described hereinabove. In embodiments, the detection method described hereinabove can be modified such that if the artificial neural network in nominal mode detects a plurality of features in the same physical signal fed thereto (in particular a plurality of objects in the same image), then the artificial neural network is then executed directly in accelerated processing mode without waiting for the end of the period T1. More specifically, the detection of a plurality of features in the same physical signal received increases the probability of at least one feature effectively being present in this physical signal received.

The program PRG and the tracking method described hereinabove use a multi-resolution neural network fed different physical signal resolutions depending on the chosen implementation to execute the artificial neural network.

Nonetheless, in embodiments, a program PRG configured to execute a reference neural network in nominal mode and an auxiliary neural network in accelerated processing mode can also be provided. The auxiliary neural network is thus simplified compared to the reference network, requiring fewer computations to obtain detection data. The execution time for the auxiliary neural network is shorter than the execution time for the reference neural network. In this way, the execution of the auxiliary neural network allows the processing rate of the physical signals to be increased. In this way, the performance in tracking features in the sequence of physical signals can be improved, in particular when the position of the feature to be tracked in the physical signal changes quickly.

The auxiliary neural network is separate from the reference neural network. In particular, the auxiliary neural network can have a different topology than the reference neural network. In particular, the auxiliary neural network can have weights that are different from the weights of the reference neural network. The auxiliary neural network can be designed from the reference neural network by deleting some of the neurons of the reference neural network. The auxiliary neural network can be quantified in binary (refer in particular to the publication entitled "Binary Neural Networks: A Survey" by Haotong Qin et al., published on Mar. 31, 2020), which is incorporated herein by reference in its entirety.

Furthermore, in the above description, the artificial neural network is implemented by a microcontroller. Nonetheless, other IT systems capable of implementing the artificial neural network can also be provided.

A computer-readable non-transitory media includes all types of computer readable media, including magnetic storage media, optical storage media, flash media and solid state storage media.

It should be understood that software can be installed in and sold with a device. Alternatively the software can be obtained and loaded into a device, including obtaining the software through physical medium or distribution system, including, for example, from a server owned by the software creator or from a server not owned but used by the software creator. The software can be stored on a server for distribution over the Internet, for example.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   determining a probability of a presence of a feature to be tracked in a physical signal in a time sequence of physical signals using an artificial neural network having a single weight set, the physical signal being an input to the artificial neural network and capable of having different resolutions;
   executing the artificial neural network in a nominal mode of operation in response to the probability of the presence of the feature being less than a threshold, the physical signal in the nominal mode being a physical signal having a nominal resolution;
   executing the artificial neural network in an accelerated process mode of operation in response to the probability of the presence of the feature being greater than the threshold, a processing rate of the physical signal is increased in the accelerated process mode in comparison to the nominal mode, the physical signal in the accelerated process mode being a physical signal having a reduced resolution lower than the nominal resolution; and
   tracking the feature in the time sequence of physical signals based on output data generated by executing the artificial neural network in the accelerated process mode.

2. The method of claim 1, wherein the reduced resolution is a multiple of a ratio between the nominal resolution and an output resolution based on an input having the nominal resolution.

3. The method of claim 2, wherein the threshold is based on a desired recall of the artificial neural network.

4. The method of claim 2, wherein the threshold is based on a desired precision of the artificial neural network.

5. The method of claim 2, wherein the physical signal is an image of a scene acquired by a camera, an audio signal delivered by a microphone, or a signal delivered by an accelerometer, a gyroscope, a magnetometer, or a time-of-flight sensor.

6. The method of claim 5, further comprising:
   comparing a position of each feature detected in a first physical signal of the time sequence of physical signals with a position of each feature detected in a second physical signal of the time sequence of physical signals, the second physical signal directly preceding the first physical signal in the time sequence of physical signals; and
   filtering out erroneous detections of features by the artificial neural network in the accelerated process mode.

7. The method of claim 1, wherein the artificial neural network is implemented in a microcontroller.

8. A non-transitory computer-readable media storing computer instructions, that when executed by a processor, cause the processor to:
   determine a probability of a presence of a feature to be tracked in a physical signal in a time sequence of physical signals using an artificial neural network having a single weight set, the physical signal being an input to the artificial neural network and capable of having different resolutions;
   execute the artificial neural network in a nominal mode of operation in response to the probability of the presence of the feature being less than a threshold, the physical signal in the nominal mode being a physical signal having a nominal resolution;
   execute the artificial neural network in an accelerated process mode of operation in response to the probability of the presence of the feature being greater than the threshold, a processing rate of the physical signal is increased in the accelerated process mode in comparison to the nominal mode, the physical signal in the accelerated process mode being a physical signal having a reduced resolution lower than the nominal resolution; and
   track the feature in the time sequence of physical signals based on output data generated by executing the artificial neural network in the accelerated process mode.

9. The non-transitory computer-readable media of claim 8, wherein the reduced resolution is a multiple of a ratio between the nominal resolution and an output resolution based on an input having the nominal resolution.

10. The non-transitory computer-readable media of claim 9, wherein the threshold is based on a desired recall of the artificial neural network.

11. The non-transitory computer-readable media of claim 9, wherein the threshold is based on a desired precision of the artificial neural network.

12. The non-transitory computer-readable media of claim 9, wherein the physical signal is an image of a scene acquired by a camera, an audio signal delivered by a microphone, or a signal delivered by an accelerometer, a gyroscope, a magnetometer, or a time-of-flight sensor.

13. The non-transitory computer-readable media of claim 12, wherein the computer instructions when executed by the processor, cause the processor to:
compare a position of each feature detected in a first physical signal of the time sequence of physical signals with a position of each feature detected in a second physical signal of the time sequence of physical signals, the second physical signal directly preceding the first physical signal in the time sequence of physical signals; and
filter out erroneous detections of features by the artificial neural network in the accelerated process mode.

14. The non-transitory computer-readable media of claim 8, wherein the artificial neural network is implemented in a microcontroller.

15. A microcontroller, comprising:
a non-transitory memory storage comprising instructions; and
a processor in communication with the non-transitory memory storage, the execution of the instructions by the processor cause the processor to:
determine a probability of a presence of a feature to be tracked in a physical signal in a time sequence of physical signals using an artificial neural network having a single weight set, the physical signal being an input to the artificial neural network and capable of having different resolutions;
execute the artificial neural network in a nominal mode of operation in response to the probability of the presence of the feature being less than a threshold, the physical signal in the nominal mode being a physical signal having a nominal resolution;
execute the artificial neural network in an accelerated process mode of operation in response to the probability of the presence of the feature being greater than the threshold, a processing rate of the physical signal is increased in the accelerated process mode in comparison to the nominal mode, the physical signal in the accelerated process mode being a physical signal having a reduced resolution lower than the nominal resolution; and
track the feature in the time sequence of physical signals based on output data generated by executing the artificial neural network in the accelerated process mode.

16. The microcontroller of claim 15, wherein the reduced resolution is a multiple of a ratio between the nominal resolution and an output resolution based on an input having the nominal resolution.

17. The microcontroller of claim 16, wherein the threshold is based on a desired recall of the artificial neural network.

18. The microcontroller of claim 16, wherein the threshold is based on a desired precision of the artificial neural network.

19. The microcontroller of claim 16, wherein the physical signal is an image of a scene acquired by a camera, an audio signal delivered by a microphone, or a signal delivered by an accelerometer, a gyroscope, a magnetometer, or a time-of-flight sensor.

20. The microcontroller of claim 19, wherein the execution of the instructions by the processor causes the processor to:
compare a position of each feature detected in a first physical signal of the time sequence of physical signals with a position of each feature detected in a second physical signal of the time sequence of physical signals, the second physical signal directly preceding the first physical signal in the time sequence of physical signals; and
filter out erroneous detections of features by the artificial neural network in the accelerated process mode.

* * * * *